(12) United States Patent
Zhou et al.

(10) Patent No.: US 8,563,211 B2
(45) Date of Patent: Oct. 22, 2013

(54) CO-EMULSIFICATION OF INSOLUBLE COMPOUNDS WITH TONER RESINS

(75) Inventors: Ke Zhou, Oakville (CA); Sonja Hadzidedic, Oakville (CA); Guerino G. Sacripante, Oakville (CA); Kimberly D. Nosella, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/082,742

(22) Filed: Apr. 8, 2011

(65) Prior Publication Data

US 2012/0258397 A1 Oct. 11, 2012

(51) Int. Cl.
*G03G 9/00* (2006.01)

(52) U.S. Cl.
USPC .................. 430/137.17; 430/108.1; 430/137.1

(58) Field of Classification Search
USPC .............................. 430/137.1, 108.1, 137.17
See application file for complete search history.

(56) References Cited

U.S. PATENT DOCUMENTS

| | | | |
|---|---|---|---|
| 3,590,000 A | 6/1971 | Palermiti et al. | |
| 4,298,672 A | 11/1981 | Lu | |
| 4,338,390 A | 7/1982 | Lu | |
| 5,278,020 A | 1/1994 | Grushkin et al. | |
| 5,290,654 A | 3/1994 | Sacripante et al. | |
| 5,302,486 A | 4/1994 | Patel et al. | |
| 5,308,734 A | 5/1994 | Sacripante et al. | |
| 5,344,738 A | 9/1994 | Kmiecik-Lawrynowicz et al. | |
| 5,853,943 A | 12/1998 | Cheng et al. | |
| 5,959,066 A | 9/1999 | Charbonneau et al. | |
| 6,025,061 A | 2/2000 | Khanarian et al. | |
| 6,063,464 A | 5/2000 | Charbonneau et al. | |
| 6,107,447 A | 8/2000 | Kreuder et al. | |
| 6,214,507 B1 | 4/2001 | Sokol et al. | |
| 6,593,049 B1 | 7/2003 | Veregin et al. | |
| 6,743,559 B2 | 6/2004 | Combes et al. | |
| 6,756,176 B2 | 6/2004 | Stegamat et al. | |
| 6,830,860 B2 | 12/2004 | Sacripante et al. | |
| 7,029,817 B2 | 4/2006 | Robinson et al. | |
| 7,329,476 B2 | 2/2008 | Sacripante et al. | |
| 2005/0234189 A1 * | 10/2005 | Lee et al. | 524/800 |
| 2006/0216626 A1 | 9/2006 | Sacripante et al. | |
| 2007/0015075 A1 | 1/2007 | Vijayendran et al. | |
| 2008/0107989 A1 | 5/2008 | Sacripante et al. | |
| 2008/0107990 A1 | 5/2008 | Field et al. | |
| 2008/0145775 A1 | 6/2008 | Vijayendran et al. | |
| 2008/0153027 A1 | 6/2008 | Veregin et al. | |
| 2008/0236446 A1 * | 10/2008 | Zhou et al. | 106/31.25 |
| 2009/0047593 A1 | 2/2009 | Vanbesien et al. | |
| 2009/0155703 A1 | 6/2009 | Sacripante et al. | |
| 2011/0281215 A1 * | 11/2011 | Faucher et al. | 430/137.1 |

* cited by examiner

*Primary Examiner* — Thorl Chea
(74) *Attorney, Agent, or Firm* — MDIP LLC

(57) ABSTRACT

A process for making a latex emulsion suitable for use in a toner composition includes co-emulsifying a bio-based resin with an insoluble component, such as a pigment or wax, whereby the resin encapsulates the insoluble component. The resulting latex, including the insoluble component encapsulated in the resin, may then be utilized to form a toner. The insoluble component may thus be included in toner particles, which might otherwise be difficult to achieve, using emulsion aggregation processes.

19 Claims, No Drawings

CO-EMULSIFICATION OF INSOLUBLE COMPOUNDS WITH TONER RESINS

TECHNICAL FIELD

The present disclosure relates to processes for producing resin emulsions useful in producing toners. More specifically, insoluble materials, such as pigments and waxes, may be emulsified with bio-based polyester resins, with the resulting latex utilized to prepare toners.

BACKGROUND

Numerous processes are within the purview of those skilled in the art for the preparation of toners. Emulsion aggregation (EA) is one such method. Emulsion aggregation toners may be used in forming print and/or electrophotographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Emulsion aggregation/coalescing processes for the preparation of toners are illustrated in a number of patents, such as U.S. Pat. Nos. 5,290,654, 5,278, 020, 5,308,734, 5,344,738, 6,593,049, 6,743,559, 6,756,176, 6,830,860, 7,029,817, and 7,329,476, and U.S. Patent Application Publication Nos. 2006/0216626, 2008/0107989, 2008/0107990, 2008/0236446, and 2009/0047593. The disclosures of each of the foregoing patents are hereby incorporated by reference in their entirety.

Polyester EA ultra low melt (ULM) toners have been prepared utilizing amorphous and crystalline polyester resins as illustrated, for example, in U.S. Patent Application Publication No. 2008/0153027, the disclosure of which is hereby incorporated by reference in its entirety.

Many polymeric materials utilized in the formation of toners are based upon the extraction and processing of fossil fuels, leading ultimately to increases in greenhouse gases and accumulation of non-degradable materials in the environment. Bio-based polyester resins have been utilized to reduce the need of fossil fuel raw materials. An example, as disclosed in co-pending U.S. Patent Application Publication No. 2009/0155703, includes a toner having particles of a bio-based resin, such as, for example, a semi-crystalline biodegradable polyester resin including polyhydroxyalkanoates, wherein the toner is prepared by an emulsion aggregation process. One issue that may arise with these bio-based resins is it might be difficult to include otherwise insoluble materials, including pigments and/or waxes, in the toner particles.

Enhanced methods for the production of resins remain desirable.

SUMMARY

The present disclosure provides latexes and the use of the latexes in forming toners. Processes for producing these latexes and toners are also provided.

In embodiments, a process of the present disclosure may include contacting at least one polyester resin with at least one organic solvent, the solvent being immiscible with water, to form an organic phase; contacting the organic phase with a water phase including a component insoluble in the organic phase selected from the group consisting of wax dispersions, pigment dispersions, and combinations thereof; and mixing the organic phase and the water phase; evaporating the organic solvent to form a latex including the resin and the insoluble component.

In other embodiments, a process of the present disclosure may include contacting at least one polyester resin including a bio-based resin including monomers such as a fatty dimer acid, a fatty dimer diol, D-isosorbide, naphthalene dicarboxylate, azelaic acid, succinic acid, cyclohexanedioic acid, naphthalene dicarboxylic acid, terephthalic acid, glutamic acid, and combinations thereof, with at least one organic solvent immiscible with water to form an organic phase; contacting the organic phase with a water phase including a component insoluble in the organic phase such as wax dispersions, pigment dispersions, and combinations thereof; mixing the organic phase and the water phase; and evaporating the organic solvent to form a latex including the insoluble component encapsulated by the resin.

In yet other embodiments, a process of the present disclosure may include contacting at least one polyester resin with at least one organic solvent immiscible with water to form an organic phase; contacting the organic phase with a water phase including a component insoluble in the organic phase such as wax dispersions, pigment dispersions, and combinations thereof; mixing the organic phase and the water phase; evaporating the organic solvent to form a latex including the insoluble component encapsulated by the resin; contacting the latex with an optional colorant, an optional wax, and other toner additives; aggregating the latex with the toner additives to form aggregated particles; coalescing the aggregated particles to form toner particles; and recovering the toner particles.

DETAILED DESCRIPTION

In embodiments, the present disclosure provides processes for forming polyester latexes which may be utilized in forming a toner. For EA toner, pigments and/or waxes may be added during the emulsion-aggregation (EA) process. The incorporation of these otherwise insoluble materials in the toner particles may prove difficult. For example, pigments can be rejected during the EA process and/or washing stage of the toner making process, thereby changing the final color of the toner. The processes of the present disclosure may avoid some of these issues.

In embodiments, the resin is a polyester resin. In some cases, some insoluble components, such as a wax and/or pigment, may not be incorporated into a toner particle. Co-emulsification of the wax or pigment and the polyester resin may allow one to incorporate the wax into a toner. While a conventional method for co-emulsification of two components is to dissolve both of them in organic solvent, the organic solvents that can be used for resin emulsification may not dissolve the wax, such as a polyethylene wax, or pigment. Thus, in accordance with the present disclosure, in embodiments a polyethylene wax dispersion may be introduced into the water phase and mixed with resin/solvent solution under homogenization.

Bio-based resins or products, as used herein, in embodiments, include commercial and/or industrial products (other than food or feed) that may be composed, in whole or in significant part, of biological products or renewable domestic agricultural materials (including plant, animal, or marine materials) and/or forestry materials as defined by the U.S. Office of the Federal Environmental Executive.

Bio-Based Resins

In embodiments, resins utilized to form latexes suitable for forming toners in accordance with the present disclosure may include bio-based resins. As used herein, a bio-based resin is a resin or resin formulation derived from a biological source such as vegetable oil instead of petrochemicals. As renewable polymers with low environmental impact, their principal advantages include that they reduce reliance on finite resources of petrochemicals, and they sequester carbon from the atmosphere. A bio-resin includes, in embodiments, for example, a resin wherein at least a portion of the resin is derived from a natural biological material, such as animal, plant, combinations thereof, and the like.

In embodiments, bio-based resins may include natural triglyceride vegetable oils (e.g. rapeseed oil, soybean oil, sunflower oil), or phenolic plant oils such as cashew nut shell liquid (CNSL), combinations thereof, and the like. In embodiments, the bio-based resin may be an amorphous resin. Suitable bio-based amorphous resins include polyesters, polyamides, polyimides, polyisobutyrates, and polyolefins, combinations thereof, and the like.

Examples of amorphous bio-based polymeric resins which may be utilized include polyesters derived from monomers including a fatty dimer acid or diol of soya oil, D-isosorbide, and/or amino acids such as L-tyrosine and glutamic acid as described in U.S. Pat. Nos. 5,959,066, 6,025,061, 6,063,464, and 6,107,447, and U.S. Patent Application Publication Nos. 2008/0145775 and 2007/0015075, the disclosures of each of which are hereby incorporated by reference in their entirety.

In embodiments, suitable bio-based polymeric resins which may be utilized include polyesters derived from monomers including a fatty dimer acid or diol, D-isosorbide, naphthalene dicarboxylate, a dicarboxylic acid such as, for example, azelaic acid, succinic acid, cyclohexanedioic acid, naphthalene dicarboxylic acid, terephthalic acid, glutamic acid, and combinations thereof, and optionally ethylene glycol, propylene glycol and 1,3-propanediol. Combinations of the foregoing bio-based resins may be utilized, in embodiments.

In embodiments, the polyester resin may be formed by the polycondensation of isosorbide with either succinic acid or azelaic acid, or a mixture of succinic acid and azelaic acid in the presence of a catalyst. The isosorbide may be selected in an amount of, for example, from about 40 to about 60 mol %, such as from about 42 to about 55 mol %, or from about 45 to about 53 mol % of the polyester resin. The total amount of diacid may be selected in an amount of, for example, from about 40 to about 60 mol %, such as from about 42 to about 55 mol %, or from about 45 to about 53 mol % of the polyester resin. When the diacid is a combination of succinic acid and azelaic acid, the amount of succinic acid may be selected in an amount of, for example, from about 30 to about 60 mol % of the polyester resin, and the amount of azelaic acid may be selected in an amount of, for example, from greater than 0 to about 20 mol % of the polyester resin.

Polycondensation catalysts include tetraalkyl titanates such as titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide; aluminum alkoxides; alkyl zinc; dialkyl zinc; zinc oxide; stannous oxide; and combinations thereof. The catalysts may be used in amounts of, for example, from about 0.001 mol % to about 0.55 mol % based on the starting diacid or diester used to generate the polyester resin.

In other embodiments, non-bio-based polyester resins may also be used. Suitable non-bio-based polyester resins include, for example, sulfonated, non-sulfonated, crystalline, amorphous, combinations thereof, and the like. The polyester resins may be linear, branched, combinations thereof, and the like. Polyester resins may include, in embodiments, those resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

The polyester resin may have a number average molecular weight ($M_n$), as measured by gel permeation chromatography (GPC) of, for example, from about 1,000 to about 50,000, such as from about 2,000 to about 25,000, and a weight average molecular weight ($M_w$) of, for example, from about 2,000 to about 100,000, such as from about 3,000 to about 14,000, as determined by GPC using polystyrene standards. The molecular weight distribution ($M_w/M_n$) of the polyester resin may be, for example, from about 1 to about 6, such as from about 1.5 to about 4.

The polyester resin may have a glass transition temperature (Tg) of, for example, from about 30° C. to about 120° C., such as from about 40° C. to about 90° C., or from about 45° C. to about 75° C. Adding more azelaic acid relative to the amount of succinic acid in the polymer formulation will decreases the glass transition temperature of the resin.

The polyester resin may have a softening point (Ts) of, for example, from about 90° C. to about 150° C., such as from about 95° C. to about 135° C., or from about 100° C. to about 120° C. Different softening points may produce toners exhibiting different gloss levels. For example, in some embodiments, resins having a softening point of 101° C. to 103° C. produce toners having a higher gloss than toners produced with resins having a softening point of 105° C. or higher.

The polyester resin may have an acid value from about 2 to about 30 mgKOH/g, such as from about 9 to about 16 mgKOH/g, or from about 10 to about 14 mgKOH/g. The acid value (or "neutralization number" or "acid number" or "acidity") may be measured by dissolving a known amount of polymer sample in an organic solvent and titrating with a solution of potassium hydroxide (KOH) with known concentration and with phenolphthalein as a color indicator. The acid number is the mass of potassium hydroxide in milligrams that is required to neutralize one gram of chemical substance. For the polyester resins, the acid number is the measure of the amount of carboxylic acid groups in a polyester molecule.

Colorants

As noted above, in embodiments, an otherwise insoluble material, including a pigment or other colorant, may be added during formation of the polyester latex. As the colorant to be added, various known suitable colorants, such as dyes, pigments, mixtures of dyes, mixtures of pigments, mixtures of dyes and pigments, and the like, may be included in the toner. The colorant may be added in amounts from about 0.1 to about 35 weight percent of the toner, in embodiments from about 1 to about 15 weight percent of the toner, in embodiments from about 3 to about 10 weight percent of the toner.

As examples of suitable colorants, mention may be made of TiO2; carbon black like REGAL 330® and NIPEX® 35; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, orange, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Pigment Blue 15:4 and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like. Other pigments that are available from various suppliers include various pigments in the following classes identified as Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7, combinations thereof, and the like.

Wax

As also noted above, in embodiments other insoluble materials, including a wax, may be added in addition to, or instead of, a pigment, during formation of the polyester latex. A single type of wax or a combination of two or more different waxes may be added. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1 weight percent to about 25 weight percent of the toner particles, in embodiments from about 5 weight percent to about 20 weight percent of the toner particles.

The wax may include any of the various waxes conventionally used in emulsion aggregation toner compositions. Waxes that may be selected include waxes having, for example, an average molecular weight from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, functionalized polyethylene waxes, functionalized polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may include particles having a size from about 100 nm to about 300 nm.

Solvents

As noted above, solvents may be used to form the latex including the bio-based resin and insoluble materials, such as a pigment and/or wax. These solvents may include, for example, ethyl acetate, methyl ethyl ketone, dichloromethane, hexane, combinations thereof, and the like.

In embodiments, the solvents may be utilized in an amount of, for example, from about 25 weight percent to about 5000% weight percent of the resin, in embodiments from about 50 weight percent to about 2000% weight percent of the resin, in other embodiments from about 100 weight percent to about 500% weight percent of the resin.

In embodiments, an emulsion formed in accordance with the present disclosure may also include water, in embodiments, de-ionized water (DIW), in amounts from about 30% to about 95%, in embodiments, from about 35% to about 80%.

The particle size of the emulsion may be from about 50 nm to about 300 nm, in embodiments from about 100 nm to about 250 nm.

Neutralizing Agent

In embodiments, the resin and insoluble components, such as a pigment and/or wax, may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic agent may be utilized in an amount from about 0.001 weight percent to 50 weight percent of the resin, in embodiments from about 0.01 weight percent to about 25 weight percent of the resin, in embodiments from about 0.1 weight percent to 5 weight percent of the resin. In embodiments, the neutralizing agent may be added in the form of an aqueous solution. In other embodiments, the neutralizing agent may be added in the form of a solid.

Utilizing the above basic neutralization agent in combination with a resin possessing acid groups, a neutralization ratio from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 8 to about 14, in embodiments, from about 9 to about 11. The neutralization of the acid groups may, in embodiments, enhance formation of the emulsion.

Surfactants

In embodiments, a surfactant may be added to the resin, insoluble component such as pigment and/or wax, and solvent to form the emulsion.

Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration from about 5% to about 100% (pure surfactant) by weight, in embodiments, from about 10% to about 95 weight percent. In embodiments, the surfactant may be utilized so that it is present in an amount from about 0.01 weight percent to about 20 weight percent of the resin, in embodiments, from about 0.1 weight percent to about 16 weight percent of the resin, in other embodiments, from about 1 weight percent to about 14 weight percent of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

In accordance with the present disclosure, instead of adding an insoluble component such as a pigment or wax to a toner formulation as a separate dispersion, the insoluble component may be encapsulated in resin latex particles. For example, in embodiments, the insoluble component may be encapsulated in the latex by co-emulsifying the pigment and/or wax with the bio-based resin through solvent flash or phase inversion emulsification (PIE) which, in turn, may be solvent based or solvent less. While the insoluble component may be introduced as part of the water phase, the insoluble component should move into and remain in the organic phase (the dissolved or melted resin). Therefore, once the pigment and/or wax is encased in the resin, the pigment and/or wax may be successfully incorporated in the toner particles by aggregating the latex containing the pigment and/or wax.

More than one resin may be utilized in forming the latex. As noted above, the resin may be a bio-based resin. In further embodiments, the resin may be a bio-based resin, optionally in combination with an amorphous resin and/or a mixture of amorphous and crystalline resins.

In embodiments, the insoluble component may be introduced as part of the water phase. A process of the present disclosure may thus include contacting at least one resin with a water immiscible solvent to form a resin mixture, adding the mixture into a water phase under homogenization to form a latex emulsion, where the water phase includes an otherwise insoluble material dispersion such as a pigment dispersion or wax dispersion, optionally a surfactant, and optionally a neutralizing agent to neutralize the acid groups of the resin, distilling the latex to remove a water/solvent mixture in the distillate and producing a high quality latex.

In the emulsification process, the polyester resins may be dissolved in a solvent at a concentration from about 1 weight percent to about 85 weight percent resin in solvent, in embodiments from about 5 weight percent to about 60 weight percent resin in solvent. The resin in a solvent may be referred to, in embodiments, as an organic phase or an organic solvent phase.

A fixed amount of base solution (such as ammonium hydroxide) is then into a water phase including de-ionized water (DIW) in combination an otherwise insoluble material dispersion such as a pigment dispersion or wax dispersion, followed by contacting the organic solvent phase and the water phase to form a uniform dispersion of polyester particles in water through phase inversion. The solvents remain in both the polyester particles and water phase at this stage. Through vacuum distillation, the solvents are stripped off.

In embodiments, the optional surfactant utilized may be any of the surfactants mentioned herein above to ensure that proper resin neutralization occurs and leads to a high quality latex with low coarse content.

Stirring is utilized when contacting the water phase and organic solvent phase. In embodiments, the water phase can be added into the organic solvent phase. In other embodiments, the organic solvent phase can be added into the water phase. Any suitable stirring device may be utilized. In embodiments, the stirring may be at a speed from about 10 revolutions per minute (rpm) to about 50,000 rpm, in embodiments from about 20 rpm to about 20,000 rpm, in other embodiments from about 50 rpm to about 10,000 rpm. The stirring need not be at a constant speed, but may be varied. For example, as the heating of the mixture becomes more uniform, the stirring rate may be increased. In embodiments, a homogenizer (that is, a high shear device), may be utilized to form the emulsion, but in other embodiments, the process of the present disclosure may take place without the use of a homogenizer. Where utilized, a homogenizer may operate at a rate from about 3,000 rpm to about 10,000 rpm.

Following phase inversion, additional surfactant, water, and/or aqueous alkaline solution may optionally be added to dilute the phase inversed emulsion, although this is not required.

Regardless of the process utilized, after removal of the organic solvent, the pigment and/or wax may be encapsulated in resin latex particles because the insoluble compound, such as the pigment and/or wax, remains in the organic phase (the dissolved or melted resin), rather than the water phase.

The insoluble compound, now encased in the resin, may then be incorporated into toner particles by aggregating the insoluble compound containing latex. For example the latex emulsions of the present disclosure may be utilized to produce particles that are suitable for emulsion aggregation ultra low melt processes.

The emulsified resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of water to resin, the neutralization ratio, solvent concentration, and solvent composition.

The coarse content of the latex of the present disclosure may be from about 0.01 weight percent to about 5 weight percent, in embodiments, from about 0.1 weight percent to about 3 weight percent. The solids content of the latex of the present disclosure may be from about 5 weight percent to about 50 weight percent, in embodiments, from about 20 weight percent to about 40 weight percent.

In embodiments, the molecular weight of the resin emulsion particles of the present disclosure may be from about 18,000 grams/mole to about 26,000 grams/mole, in embodiments from about 21,500 grams/mole to about 25,000 grams/mole, in embodiments from about 23,000 grams/mole to about 24,000 grams/mole.

The resulting resin particles in the latex may possess the pigment in an amount from about 0.1% by weight to about 35% by weight of the resin particle, in embodiments from about 1% by weight to about 20% by weight of the resin particle. Similarly, the resulting resin particles in the latex may possess the wax in an amount from about 0.1% by weight to about 25% by weight of the resin particle, in embodiments from about 5% by weight to about 20% by weight of the resin particle.

Toner

Once the resin mixture has been contacted with water to form an emulsion and the solvent removed from this mixture as described above, the resulting latex may then be utilized to form a toner by any method within the purview of those skilled in the art. The latex emulsion may be contacted with other optional resins, colorants and/or waxes, optionally in a dispersion, and other additives to form an ultra low melt toner by a suitable process, in embodiments, an emulsion aggregation and coalescence process.

Toner Preparation

Toner particles may be prepared with the above latex, including resin-encapsulated insoluble components, by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resin-encapsulated toner components described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0 to about 10 weight percent, in embodiments from about 0.2 to about 8 weight percent, in other embodiments from about 0.5 to about 5 weight percent, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be from about 2 µm to about 12 µm, in embodiments from about 3 µm to about 10 µm.

Shell Resin

In embodiments, after aggregation, but prior to coalescence, a resin coating may be applied to the aggregated particles to form a shell thereover. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, the amorphous resins described above. In embodiments, an amorphous resin which may be utilized to form a shell in accordance with the present disclosure includes an amorphous polyester. Multiple resins may be utilized in any suitable amounts.

The shell resin may be applied to the aggregated particles by any method within the purview of those skilled in the art. In embodiments, the resins utilized to form the shell may be in an emulsion including any surfactant described above. The emulsion possessing the resins may be combined with the aggregated particles described above so that the shell forms over the aggregated particles.

The formation of the shell over the aggregated particles may occur while heating to a temperature from about 30° C. to about 80° C., in embodiments from about 35° C. to about 70° C. The formation of the shell may take place for a period of time from about 5 minutes to about 10 hours, in embodiments from about 10 minutes to about 5 hours.

The shell may be present in an amount from about 1 percent by weight to about 80 percent by weight of the toner components, in embodiments from about 10 percent by weight to about 40 percent by weight of the toner components, in still further embodiments from about 20 percent by weight to about 35 percent by weight of the toner components.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 1000 rpm to about 100 rpm, in embodiments from about 800 rpm to about 200 rpm. Coalescence may be accomplished over a period from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric charge enhancement, admix control, improved development and transfer stability, and higher toner blocking temperature. $TiO_2$ may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0.1 weight percent to about 5 weight percent of the toner, in embodiments from about 0.25 weight percent to about 3 weight percent of the toner, although the amount of additives can be outside of these ranges. In embodiments, the toners may include, for example, from about 0.1 weight percent to about 5 weight percent titania, from about 0.1 weight percent to about 8 weight percent silica, and from about 0.1 weight percent to about 4 weight percent zinc stearate.

Suitable additives include those disclosed in U.S. Pat. Nos. 3,590,000, and 6,214,507, the disclosures of each of which are hereby incorporated by reference in their entirety.

It has been found that toners produced in accordance with the present disclosure have little rejection of the pigments and/or waxes that would otherwise be insoluble in the latex utilized to form the toner particles. Thus, for example, at least about 80% by weight of the pigment or wax utilized in forming the latex may be present in a toner later produced with the latex, in embodiments from about 90% by weight to about 100% by weight of the pigment or wax utilized in forming the latex may be present in a toner later produced with the latex, in embodiments from about 92% by weight to about 98% by weight of the pigment or wax utilized in forming the latex may be present in a toner later produced with the latex.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature from about 20° C. to about 25° C.

EXAMPLES

Comparative Example 1

Preparation of an emulsion aggregation (EA) toner, where a pigment dispersion was added separately in the toner formulation. Into a 1000 ml glass beaker equipped with a magnetic stir bar and a hotplate, about 296.74 grams of an emulsion containing 100% by weight of a bio-based resin made from 50% isosorbide, 45% succinic acid, and 5% azelaic acid, about 20.45 grams of a cyan pigment dispersion (Pigment Blue 15:3 (17% by weight), and about 2.91 grams of DOWFAX™ 2A1, an alkyldiphenyloxide disulfonate (commercially available from the Dow Chemical Company) (about 47% by weight). The above mixture was cooled to about 8° C. using an ice bath. After the pH was adjusted to about 4.2, about 22.29 grams of $Al_2(SO_4)_3$ solution (about 1% by weight) was added as a flocculent under homogenization. The temperature of the mixture was increased to about 17.9° C. with stirring at about 900 revolutions per minute (rpm). The particle size was monitored with a Coulter Counter until the core particles reached a volume average particle size of about 5.83 μm, with a volume average Geometric Size Distribution (GSDv) of about 1.27.

A sample taken at this point visibly showed severe pigment rejection.

The pH of the reaction slurry was then increased to about 7.5 using about 1.72 grams of ethylene diamine tetraacetic acid (EDTA) about (39% by weight) and NaOH (about 4% by weight) to freeze, i.e., stop, the toner growth. After freezing, the reaction mixture was heated to about 40.7° C., and the pH was reduced to about 7.01 for coalescence. The toner was quenched after coalescence, and it had a final particle size of about 5.48 microns, a GSDv of about 1.33, and a circularity of about 0.965.

A sample of the above toner slurry was taken and settled in a glass vial. The sample had severe pigment rejection, and toner having a very light color settled at the bottom of the vial.

Example 1

Preparation of latex with pigment encapsulated in bio-resin particles. About 56.7 grams of the 100% bio based resin described above in Comparative Example 1 was measured into a 2 liter beaker containing about 500 grams of dichloromethane. The mixture was stirred at about 300 revolutions per minute at room temperature to dissolve the resin in the dichloromethane, thereby forming a resin solution.

About 21.16 grams of the cyan pigment dispersion described above in Comparative Example 1 (about 17% by weight containing 9 parts per hundred (pph) of a branched sodium dodecyl benzene sulfonate surfactant from Tayca Corporation (Japan)) together with about 1.14 grams of sodium bicarbonate and about 2.41 grams DOWFAX™ 2A1, an alkyldiphenyloxide disulfonate (commercially available from the Dow Chemical Company) (about 47% by weight) was measured into a 3 liter Pyrex glass flask reactor containing about 300 grams of deionized water, thereby forming a water solution. Homogenization of said water solution in said 3 liter glass flask reactor was commenced with an IKA Ultra Turrax T50 homogenizer operating at about 4,000 revolutions per minute. The resin solution was then slowly poured into the water solution. As the mixture continued to be homogenized, the homogenizer speed was increased to about 8,000 revolutions per minute and homogenization was carried out at these conditions for about 30 minutes. Upon completion of homogenization, the glass flask reactor and its contents were placed in a heating mantle and connected to a distillation device.

The mixture was stirred at about 200 revolutions per minute and the temperature of the mixture was increased to about 50° C. at a rate of about 1° C. per minute to distill off the dichloromethane from the mixture. Stirring continued at about 50° C. for about 180 minutes, followed by cooling at about 2° C. per minute to room temperature. The product was screened through a 25 micron sieve.

The resulting resin emulsion included about 19.39 percent by weight solids in water, with an average particle size of 141.2 nm.

Example 2

Preparation of EA toner with pigment encapsulated in a bio-resin emulsion. Into a 1000 ml glass beaker equipped with a magnetic stir bar and a hotplate, about 3.07 grams DOWFAX™ 2A1, an alkyldiphenyloxide disulfonate (commercially available from the Dow Chemical Company) (about 47% by weight), was combined with about 304.05 grams of the latex from Example 1, including the bio-based resin with encapsulated cyan pigment. The mixture was cooled to about 8° C. using an ice bath. After the pH of the components was adjusted to about 4.2, about 23.02 grams of $Al_2(SO_4)_3$ solution (1% by weight) was added as a flocculent under homogenization. The temperature of the mixture was increased to about 19° C. with mixing at about 900 rpm. The particle size was monitored with a Coulter Counter until the core particles reached a volume average particle size of about 6.15 μm with a GSDv of about 1.26.

A sample taken at this point had clear mother liquor. The pH of the reaction slurry was then increased to about 7.3 using about 1.79 grams EDTA (about 39% by weight) and NaOH (about 4% by weight) to freeze, i.e., stop, the toner growth.

After freezing, the reaction mixture was heated to about 40.3° C., and the pH was about 7. The toner was quenched after coalescence, and it had a final particle size of about 5.48 microns, a volume average Geometric Size Distribution of about 1.26, and a circularity of about 0.969.

A sample of the above toner slurry was taken and settled in a glass vial. The sample had reasonably clear mother liquor, and toner having the expected cyan color settled at the bottom.

Following the above synthesis, it was found that an organic based pigment stayed in the latex particles. The pigment was thus incorporated in toner particles successfully by aggregating the pigment containing latex.

Example 3

Preparation of a latex with wax encapsulated in bio-resin particles. About 69 grams of the bio based resin described above in Comparative Example 1 was measured into a 2 liter beaker containing about 700 grams of dichloromethane. The mixture was stirred at about 300 revolutions per minute at room temperature to dissolve the resin in the dichloromethane, thereby forming a resin solution.

About 36.45 grams of a polyethylene wax, commercially available as IGI wax in a dispersion (about 30.37% by weight) and about 41.8 grams of the cyan pigment dispersion described above in Comparative Example 1 (about 17% by weight containing 9 parts per hundred (pph) of the branched sodium dodecyl benzene sulfonate surfactant from Tayca Corporation) together with about 1.1 grams of sodium bicarbonate and about 2.94 grams DOWFAX™ 2A1, an alkyldiphenyloxide disulfonate (commercially available from the Dow Chemical Company) (about 47% by weight) was measured into a 3 liter Pyrex glass flask reactor containing about 500 grams of deionized water, thereby forming a water solution. Homogenization of the water solution in the 3 liter glass flask reactor was commenced with an IKA Ultra Turrax T50 homogenizer operating at about 4,000 revolutions per minute. The resin solution was then slowly poured into the water solution. As the mixture continued to be homogenized, the homogenizer speed was increased to about 8,000 revolutions per minute and homogenization was carried out at these conditions for about 30 minutes.

Upon completion of homogenization, the glass flask reactor and its contents were placed in a heating mantle and connected to a distillation device. The mixture was stirred at about 200 revolutions per minute and the temperature of the mixture was increased to about 50° C. at a rate of about 1° C. per minute to distill off the dichloromethane from the mixture. Stirring of the mixture continued at about 50° C. for about 150 minutes followed by cooling at about 2° C. per minute to room temperature. The product was screened through a 25 micron sieve. The resulting resin emulsion included about 14.26 percent by weight solids in water.

Example 4

Preparation of EA toner with the wax encapsulated resin. About 3.59 grams DOWFAX™ 2A1, an alkyldiphenyloxide disulfonate (commercially available from the Dow Chemical Company) (about 47% by weight) and about 391.13 grams of the latex from Example 3 were added to a 2 liter glass reactor equipped with an overhead stirrer. The mixture was cooled to about 8° C. using an ice bath, and the pH was adjusted to about 4.2. About 46.79 grams of $Al_2(SO_4)_3$ solution (about 1% by weight) was added as a flocculent under homogenization. The temperature of the mixture was increased to about 17.1° C. with stirring at about 300 rpm. The particle size was monitored with a Coulter Counter until the core particles reached a volume average particle size of about 4.78 μm, with a GSDv of about 1.19. About 150.48 grams of the same bio-based resin used in Example 3 in an emulsion (about 17.84% by weight, with no wax or pigment) was added as shell, resulting in core-shell structured particles having an average particle size of about 6.21 microns, and a GSDv of about 1.23.

Thereafter, the pH of the reaction slurry was increased to about 8 using about 3.62 grams EDTA (about 39% by weight) and NaOH (about 4% by weight) to freeze, i.e., stop, the toner growth. After freezing, the reaction mixture was heated to about 40.3° C., and pH was about 7. The toner was quenched after coalescence, and it had a final particle size of about 9.44 microns, and a volume average GSD of about 1.35.

Differential Scanning Calorimetry (DSC) of the toner sample showed that about 11% of the wax was incorporated into the toner, compared with 9% of wax that was initially put in the toner formulation. Thus, after aggregating the wax containing latex, DSC proved that the IGI polyethylene wax was successfully incorporated into the toner.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:
1. A process comprising:
contacting at least one bio-based polyester resin with at least one organic solvent, the solvent being immiscible with water, to form an organic phase resin solution;
contacting the organic phase resin solution with a water phase comprising a component insoluble in the organic phase resin solution selected from the group consisting of wax dispersions, pigment dispersions, and combinations thereof;
mixing the organic phase and the water phase; and
evaporating the organic solvent to form a latex emulsion comprising the insoluble component encapsulated by the polyester resin.

2. The process of claim 1, wherein the at least one bio-based polyester resin comprises monomers selected from the group consisting of a fatty dimer acid, a fatty dialer diol, D-isosorbide, naphthalene dicarboxylate, azelaic acid, succinic acid, cyclohexanedioic acid, naphthalene dicarboxylic acid, terephthalic acid, glutamic acid, and combinations thereof.

3. The process of claim 2, wherein the bio-based resin further comprises an alcohol selected from the group consisting of ethylene glycol, propylene glycol and 1,3-propanediol.

4. The process of claim 1, wherein the solvent is selected from the group consisting of methyl ethyl ketone, dichloromethane, ethyl acetate, hexane, and combinations thereof.

5. The process according to claim 1, wherein said pigment comprises carbon black, titanium dioxide, Pigment Yellow 180, Pigment Yellow 12, Pigment Yellow 13, Pigment Yellow 17, Pigment Blue 15, Pigment Blue 15.3, Pigment Blue 15:4, Pigment Red 81:1, Pigment Red 81:2, Pigment Red 81:3, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7, and combinations thereof.

6. The process of claim 1, wherein the water phase further comprises a neutralizing agent selected from the group consisting of ammonium hydroxide, potassium hydroxide, sodium hydroxide, sodium carbonate, sodium bicarbonate, lithium hydroxide, potassium carbonate, and combinations thereof.

7. The process of claim 1, wherein the water phase further comprises a surfactant.

8. The process according to claim 1, wherein the wax is a polyolefin selected from the group consisting of a polyethylene including linear polyethylene waxes, branched polyethylene waxes, a polypropylene including linear polypropylene waxes, branched polypropylene waxes, functionalized polyethylene waxes, functionalized polypropylene waxes, polyethylene/amide, polyethylenetetrafluoroethylene, polyethylenetetrafluoroethylene/amide, polybutene waxes, and combinations thereof.

9. A process according to claim 1, wherein the evaporating is completed by heating the mixture to a temperature of from 40° C. to 90° C.

10. A process comprising:
contacting, at least one polyester resin comprising a bio-based resin comprising monomers selected from the group consisting of a fatty dimer acid, a fatty dimer diol, D-isosorbide, naphthalene dicarboxylate, azelaic acid, succinic acid, cyclohexanedioic acid, naphthalene dicarboxylic acid, terephthalic acid, glutamic acid, and combinations thereof, with at least one organic solvent immiscible with water to form an organic phase resin solution;

contacting the organic phase resin solution with a water phase comprising a component insoluble in the organic phase resin solution selected from the group consisting of wax dispersions, pigment dispersions, and combinations thereof;

mixing the organic phase and the water phase; and evaporating the organic solvent to form a latex emulsion comprising the insoluble component encapsulated by the resin.

11. The process of claim 10, wherein the solvent, is selected from the group consisting of methyl ethyl ketone, dichloromethane, ethyl acetate, hexane, and combinations thereof.

12. A process according to claim 10, wherein the pigment dispersion comprises carbon black, titanium dioxide, Pigment Yellow 180, Pigment Yellow 12, Pigment Yellow 13, Pigment Yellow 17, Pigment Blue 15, Pigment Blue 15:3, Pigment Red 81:1, Pigment Red 81:2, Pigment Red 81:3, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and combinations thereof.

13. A process according to claim 10, wherein the wax is a polyolefin selected from the group consisting of a polyethylene including linear polyethylene waxes, branched polyethylene waxes, a polypropylene including linear polypropylene waxes, branched polypropylene waxes, functionalized polyethylene waxes, functionalized polypropylene waxes, polyethylene/amide, polyethylenetetrafluoroethylene, polyethylenetetrafluoroethylene/amide, polybutene waxes, and combinations thereof.

14. A process according to claim 10, wherein the latex has a solids content from 5% to 50%, and a particle size from 10 nm to 500 nm.

15. A process according to claim 10, wherein evaporating the organic solvent occurs at a temperature of from 40° C. to 90° C.

16. A process comprising:
contacting at least one bio-based polyester resin with at least one organic solvent immiscible with water to form an organic phase resin solution;

contacting the organic phase resin solution with a water phase comprising a component insoluble in the organic phase resin solution selected from the group consisting of wax dispersions, pigment dispersions, and combinations thereof;

mixing the organic phase and the water phase;

evaporating the organic solvent for form a latex emulsion comprising the insoluble component encapsulated by the resin;

contacting the latex emulsion with an optional colorant, an optional wax, and other toner additives;

aggregating, the latex emulsion with the toner additives to form aggregated particles;

coalescing the aggregated particles to form toner particles; and recovering the toner particles.

17. A process according to claim 16, wherein the pigment is selected from the group consisting of carbon black, titanium dioxide, Pigment Yellow 180, Pigment Yellow 12, Pigment Yellow 13, Pigment Yellow 17, Pigment Blue 15, Pigment Blue 15:3, Pigment Red 81:1, Pigment Red 81:2, Pigment Red 81:3, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and combinations thereof, and the wax is selected from the group consisting of polyolefins, such as polyethylene including linear polyethylene waxes and branched polyethylene waxes, polypropylene including linear polypropylene waxes and branched polypropylene waxes, functionalized polyethylene waxes, functionalized polypropylene waxes, polyethylene/amide, polyethylenetetrafluoroethylene, polyethylenetetrafluoroethylene/amide, polybutene waxes, and combinations thereof.

18. A process according to claim 16, wherein evaporating the organic solvent occurs at a temperature from about 40° C. to about 90° C.

19. A process according to claim 16, wherein from about 80% by weight to about 100% by weight of the insoluble component in the latex may be present in the toner produced with the latex.

* * * * *